(12) United States Patent
Nguyen et al.

(10) Patent No.: US 11,967,835 B2
(45) Date of Patent: Apr. 23, 2024

(54) POWER SUPPLY APPARATUS AND POWER SUPPLY SYSTEM

(71) Applicant: OMRON Corporation, Kyoto (JP)

(72) Inventors: Manh Tai Nguyen, Kyoto (JP); Kentaro Hamana, Kyoto (JP); Akito Murai, Kyoto (JP); Yoshiki Sugimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 156 days.

(21) Appl. No.: 17/621,316

(22) PCT Filed: Jul. 19, 2019

(86) PCT No.: PCT/JP2019/028473
§ 371 (c)(1),
(2) Date: Dec. 21, 2021

(87) PCT Pub. No.: WO2021/014496
PCT Pub. Date: Jan. 28, 2021

(65) Prior Publication Data
US 2022/0360114 A1    Nov. 10, 2022

(51) Int. Cl.
*H02J 50/60* (2016.01)
*H02J 50/23* (2016.01)
*H02J 50/40* (2016.01)

(52) U.S. Cl.
CPC .............. *H02J 50/60* (2016.02); *H02J 50/23* (2016.02); *H02J 50/40* (2016.02)

(58) Field of Classification Search
CPC .. H02J 50/60; H02J 50/23; H02J 50/40; H02J 50/80; H02J 50/90; H02J 50/20; H02J 50/27
See application file for complete search history.

(56) References Cited

U.S. PATENT DOCUMENTS 8,469,122 B2 *   6/2013  Perlman ................ B60L 53/124
                                                         342/372
9,124,114 B2 *   9/2015  Haruyama ............... H02J 50/80
(Continued)

FOREIGN PATENT DOCUMENTS

EP        3236561 A1     10/2017
JP     2016149728 A      8/2016
(Continued)

OTHER PUBLICATIONS

International Search Report for International Application No. PCT/JP2019/028473; dated Oct. 8, 2019.
(Continued)

*Primary Examiner* — Daniel Cavallari
*Assistant Examiner* — Brian K Baxter
(74) *Attorney, Agent, or Firm* — CANTOR COLBURN LLP

(57) ABSTRACT

A power supply apparatus according to the present invention includes a power supply antenna, a directivity control unit, a position information acquisition unit, and a control unit. The power supply antenna emits, to a plurality of power reception apparatuses, a radio wave that is based on a power supply signal. The directivity control unit controls directivity of the power supply antenna. The position information acquisition unit acquires position information indicating a position of a moving obstruction. The control unit determines, based on the position information, a power reception apparatus, among the plurality of power reception apparatuses, to which power is supplied while avoiding the obstruction. The control unit controls the directivity control unit to steer the radio wave toward the determined power reception apparatus.

6 Claims, 9 Drawing Sheets

(56) References Cited

U.S. PATENT DOCUMENTS

| | | | |
|---|---|---|---|
| 9,614,402 B2* | 4/2017 | Yamada | H02J 50/80 |
| 9,847,664 B2* | 12/2017 | Kozuma | H02J 50/10 |
| 9,991,752 B1* | 6/2018 | Tani | H02J 50/23 |
| 10,749,379 B2* | 8/2020 | Okamoto | H02J 50/12 |
| 2013/0082651 A1* | 4/2013 | Park | H02J 50/80 320/108 |
| 2015/0229136 A1* | 8/2015 | Fukaya | H02J 50/80 307/104 |
| 2016/0299210 A1 | 10/2016 | Zeine | |
| 2017/0110887 A1* | 4/2017 | Bell | H02J 7/00034 |
| 2018/0006508 A1* | 1/2018 | Ueki | H02J 50/80 |
| 2018/0069441 A1* | 3/2018 | Kanno | H02J 50/12 |
| 2018/0205259 A1* | 7/2018 | Yamamoto | H02J 50/80 |
| 2018/0259615 A1 | 9/2018 | Zeine | |
| 2018/0287429 A1* | 10/2018 | Yamamoto | H02J 50/80 |
| 2019/0058349 A1* | 2/2019 | Kim | H01M 10/44 |
| 2019/0337404 A1* | 11/2019 | Matsuo | B60L 53/124 |
| 2020/0057474 A1* | 2/2020 | Pabbisetty | H02J 50/90 |
| 2020/0076241 A1* | 3/2020 | Tandai | H02J 50/80 |
| 2020/0125810 A1* | 4/2020 | Pettus | G06K 19/067 |
| 2021/0063525 A1 | 3/2021 | Zeine | |
| 2021/0373117 A1* | 12/2021 | Zeine | H02J 50/40 |
| 2022/0060059 A1* | 2/2022 | Murai | H02J 50/80 |
| 2022/0103022 A1* | 3/2022 | Bell | H02J 50/20 |
| 2022/0294273 A1* | 9/2022 | Hamana | H02J 50/40 |

FOREIGN PATENT DOCUMENTS

| | | |
|---|---|---|
| JP | 2018130008 A | 8/2018 |
| JP | 2018523454 A | 8/2018 |
| JP | 2019506826 A | 3/2019 |
| WO | 2016164243 A1 | 10/2016 |
| WO | 2017112942 A1 | 6/2017 |

OTHER PUBLICATIONS

PCT Written Opinion of the International Searching Authority for International Application No. PCT/JP2019/028473; dated Oct. 8, 2019.

EPO Extended European Search Report for corresponding EP Application No. 19938843.0; dated Mar. 24, 2023.

* cited by examiner

LATEST REGISTERED POSITION

LATEST REGISTERED POSITION

POWER SUPPLY APPARATUS AND POWER SUPPLY SYSTEM

CROSS REFERENCE TO RELATED APPLICATIONS

This is the U.S. national stage of application No. PCT/JP2019028473, filed on Jul. 19, 2019. Priority of which is claimed, the disclosure of is incorporated herein by reference.

TECHNICAL FIELD

The present invention relates to a power supply apparatus and a power supply system.

BACKGROUND ART

Conventionally, there has been a technique for supplying power wirelessly (for example, see patent literature 1). A power supply apparatus outputs a radio wave, and a power reception apparatus receives the radio wave. By transmitting and receiving radio waves, power is supplied from the power supply apparatus to the power reception apparatus.

CITATION LIST

Patent Literature

PTL1: JP149728/2016A

SUMMARY OF INVENTION

A power supply apparatus according to a first aspect of the present disclosure includes a power supply antenna, a directivity control unit, a position information acquisition unit, and a control unit. The power supply antenna is configured to emit, to a plurality of power reception apparatuses, a radio wave that is based on a power supply signal. The directivity control unit is configured to control directivity of the power supply antenna. The position information acquisition unit is configured to acquire position information indicating a position of an obstruction moving between the power supply antenna and at least one power reception apparatus of the plurality of power reception apparatuses. Based on the position information, the control unit is configured to determine a power reception apparatus, among the plurality of power reception apparatuses, to which power is to be supplied while avoiding the obstruction. The control unit is also configured to control the directivity control unit to steer the radio wave toward the determined power reception apparatus.

DESCRIPTION OF EMBODIMENTS

Figure 1:
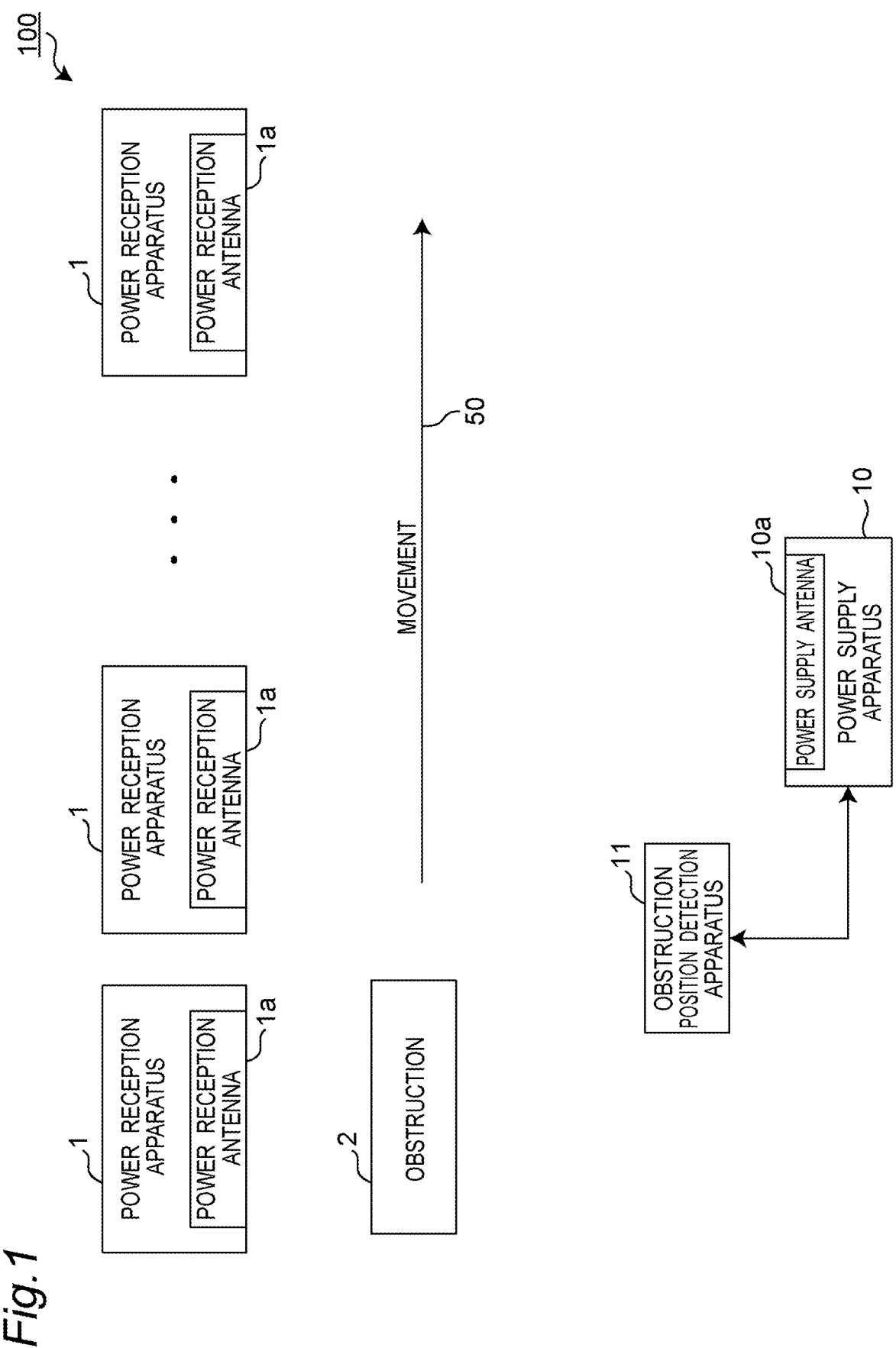
FIG. 1 is a diagram illustrating a schematic configuration of a power supply system according to an embodiment.

FIG. 1 is a diagram illustrating a schematic configuration of a power supply system 100 according to the present embodiment. As illustrated in FIG. 1, the power supply system 100 includes a plurality of power reception apparatuses 1, a power supply apparatus 10, and an obstruction position detection apparatus 11. In the power supply system 100, the power supply apparatus 10 supplies power wirelessly to each of the power reception apparatuses 1.

In order to supply power, the power supply apparatus 10 outputs an electromagnetic wave (hereinafter referred to as radio wave) to each power reception apparatus 1. Each power reception apparatus 1 includes a power reception antenna 1a. In the power reception apparatus 1, a radio wave received by the power reception antenna 1a is converted into electrical energy. Thus, by the power reception antenna 1a receiving a radio wave, the power reception apparatus 1 is able to receive a supply of power.

In the power supply system 100, an obstruction 2 moves. For example, as illustrated in FIG. 1, the obstruction 2 moves along a direction 50. The obstruction 2 moves between the power supply apparatus 10 and at least one or more power reception apparatuses 1. In this respect, in the configuration example illustrated in FIG. 1, the obstruction 2 moves between the power supply apparatus 10 (more specifically, the power supply antenna 10a) and each power reception apparatus 1 (more specifically, each power reception antenna 1a). By the movement of the obstruction 2, the radio wave output from the power supply apparatus 10 is blocked.

For example, when the obstruction 2 exists between the power supply apparatus 10 and a predetermined power reception apparatus 1, the obstruction 2 blocks the radio wave output from the power supply apparatus 10 to the predetermined power reception apparatus 1. That is, the obstruction 2 is a moving tangible object in the power supply system 100, and is capable of blocking radio waves output from the power supply apparatus 10 to the power reception apparatuses 1 in the power supply system 100. Thus, the power supply from the power supply apparatus 10 to the power reception apparatuses 1 can be blocked by the obstruction 2.

The obstruction position detection apparatus 11 detects the position of the moving obstruction 2. The obstruction position detection apparatus 11 is communicably connected to the power supply apparatus 10. With this configuration, the obstruction position detection apparatus 11 is capable of transmitting the detection result (position information indicating the position of the obstruction 2) to the power supply apparatus 10. It is to be noted that the communication between the obstruction position detection apparatus 11 and the power supply apparatus 10 may be wired communication or wireless communication.

As the obstruction position detection apparatus 11, it is possible to employ any of various sensors, examples including a photoelectric sensor, a proximity sensor, an acceleration sensor, and a pressure sensor. The obstruction position detection apparatus 11 is also capable of detecting the position of the obstruction 2 using a signal from an RFID (radio frequency identifier) mounted on the obstruction 2. The obstruction position detection apparatus 11 may also be a device that includes various radars and/or a camera in order to detect the position of the obstruction 2.

Figure 2:
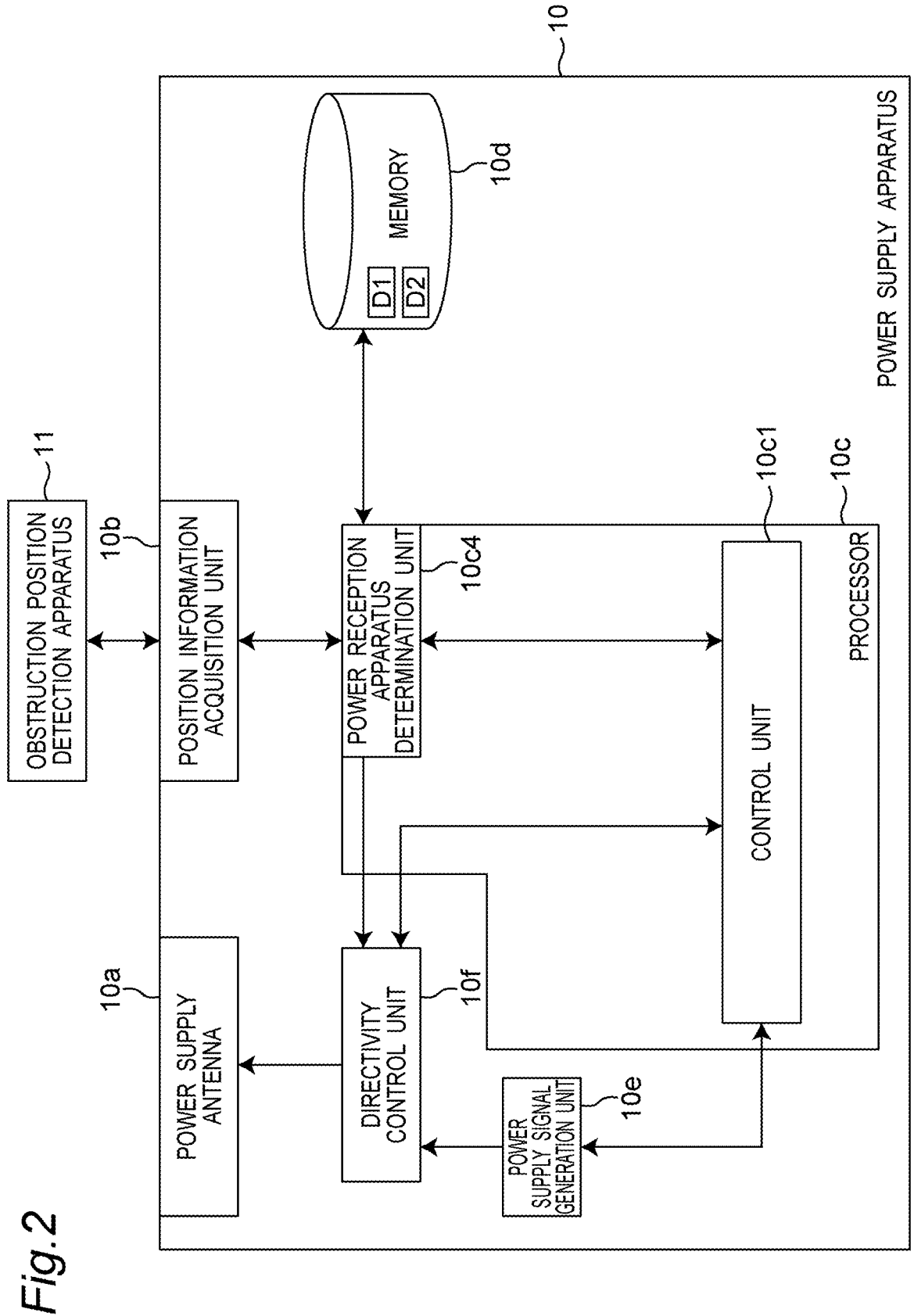
FIG. 2 is a diagram illustrating a schematic configuration of a power supply apparatus illustrated in FIG. 1.

FIG. 2 is a diagram illustrating a specific configuration of the power supply apparatus 10. Next, a configuration of the power supply apparatus 10 will be described with reference to FIG. 2.

The power supply apparatus 10, which supplies power wirelessly to the power reception apparatuses 1, includes a power supply antenna 10a, a position information acquisition unit 10b, a processor 10c, a memory 10d, a power supply signal generation unit 10e, and a directivity control unit 10f. The power supply antenna 10a, the position information acquisition unit 10b, the memory 10d, the power supply signal generation unit 10e, and the directivity control unit 10f are connected to the processor 10c.

The power supply antenna 10a emits, to each of the respective power reception apparatuses 1, a radio wave that is based on a power supply signal. For example, the power supply antenna 10a may be an array antenna made up of a plurality of element antennas.

The position information acquisition unit 10b is a communication unit, and is communicably connected to the obstruction position detection apparatus 11. With this configuration, the position information acquisition unit 10b acquires the above-described position information, which is the detection result acquired by the obstruction position detection apparatus 11.

The power supply signal generation unit 10e includes a high-frequency circuit that generates power supply signals. In order to generate a power supply signal, the high-frequency circuit performs various kinds of processing, such as signal generation, distribution, amplification, and filtering.

The directivity control unit 10f controls the directivity of the power supply antenna 10a. As described later, the directivity control unit 10f controls the directivity of the power supply antenna 10c4 so as to steer a radio wave to a power reception apparatus (power-supply-target power reception apparatus 1 to which power is to be supplied) 1 determined as power suppliable by the power reception apparatus determination unit 10a. By controlling the directivity, the main beam of the radio wave emitted from the power supply antenna 10a is directed to the power-supply-target power reception apparatus 1. That is, in the radio wave emitted from the power supply antenna 10a, the intensity of the beam in the direction toward the power-supply-target power reception apparatus 1 is maximized.

The memory 10d, which is a storage unit, stores various types of data. The memory 10d includes, for example, a random access memory (RAM) and a read only memory (ROM). For example, the memory 10d stores various programs in a changeable manner. The memory 10d also stores, in a changeable manner, a correspondence relationship table D1 (see FIG. 4), which will be described later, and an obstruction position history information table D2 (see FIG. 6 and FIG. 7), which will be described later.

The processor 10c, which is a control unit, includes a CPU (Central Processing Unit). For example, the processor 10c reads programs and data stored in the memory 10d. Based on a program that has been read, the processor 10c controls the power supply antenna 10a, the position information acquisition unit 10b, the memory 10d, the power supply signal generation unit 10e, and the directivity control unit 10f to execute a predetermined operation and a predetermined function. Also based on a program that has been read, the processor 10c performs predetermined calculation, analysis, processing, and control in blocks 10c1 and 10c4, which are implemented by the program in the processor 10c.

As illustrated in FIG. 2, the processor 10c according to the present embodiment includes, as functional blocks, an overall control unit 10c1 and a power reception apparatus determination unit 10c4.

According to power supply processing flows (FIG. 3 and FIG. 5), described later, the overall control unit 10c1 controls operation timings of, for example, the position information acquisition unit 10b, the memory 10d, the power supply signal generation unit 10e, and the directivity control unit 10f.

Using the position information acquired by the position information acquisition unit 10b, the power reception apparatus determination unit 10c4 determines a power-supply-target power reception apparatus 1, among the plurality of power reception apparatuses 1, to which power is to be supplied. More specifically, the power reception apparatus determination unit 10c4 determines the power-supply-target power reception apparatus 1 using the position information and the data stored in the memory 10d (the correspondence relationship table D1 and the obstruction position history information table D2).

The power-supply-target power reception apparatus 1 means a power reception apparatus 1 capable of receiving wireless power supply from the power supply apparatus 10 while avoiding the obstruction 2 (without being affected by radio wave blocking by the obstruction 2). Between the determined power-supply-target power reception apparatus 1 and the power supply apparatus 10, the supply of radio wave from the power supply apparatus 10 is not interrupted by the obstruction 2 existing at the position identified by the position information.

The power reception apparatus determination unit 10c4 controls the directivity control unit 10f to steer a radio wave to the power-supply-target power reception apparatus 1. In response to this control, the directivity control unit 10f controls the directivity of the power supply antenna 10a to steer the radio wave to the power-supply-target power reception apparatus 1.

For example, when the power supply antenna 10a is the above-described array antenna, the directivity control unit 10f adjusts the phases and amplitudes of the power supply signals to the element antennas. This ensures that the directivity of the radio wave emitted from the power supply antenna 10a can be controlled. It is also possible that a plurality of directivity patterns are set in the memory 10d in advance, and that the directivity control unit 10f selects a suitable pattern based on the position of the power-supply-target power reception apparatus 1. It is also possible that the power supply antenna 10a is provided on a rotary table, and that the directivity control unit 10f mechanically controls the rotation of the rotary table to control the directivity of the radio wave to be emitted.

Figure 3:
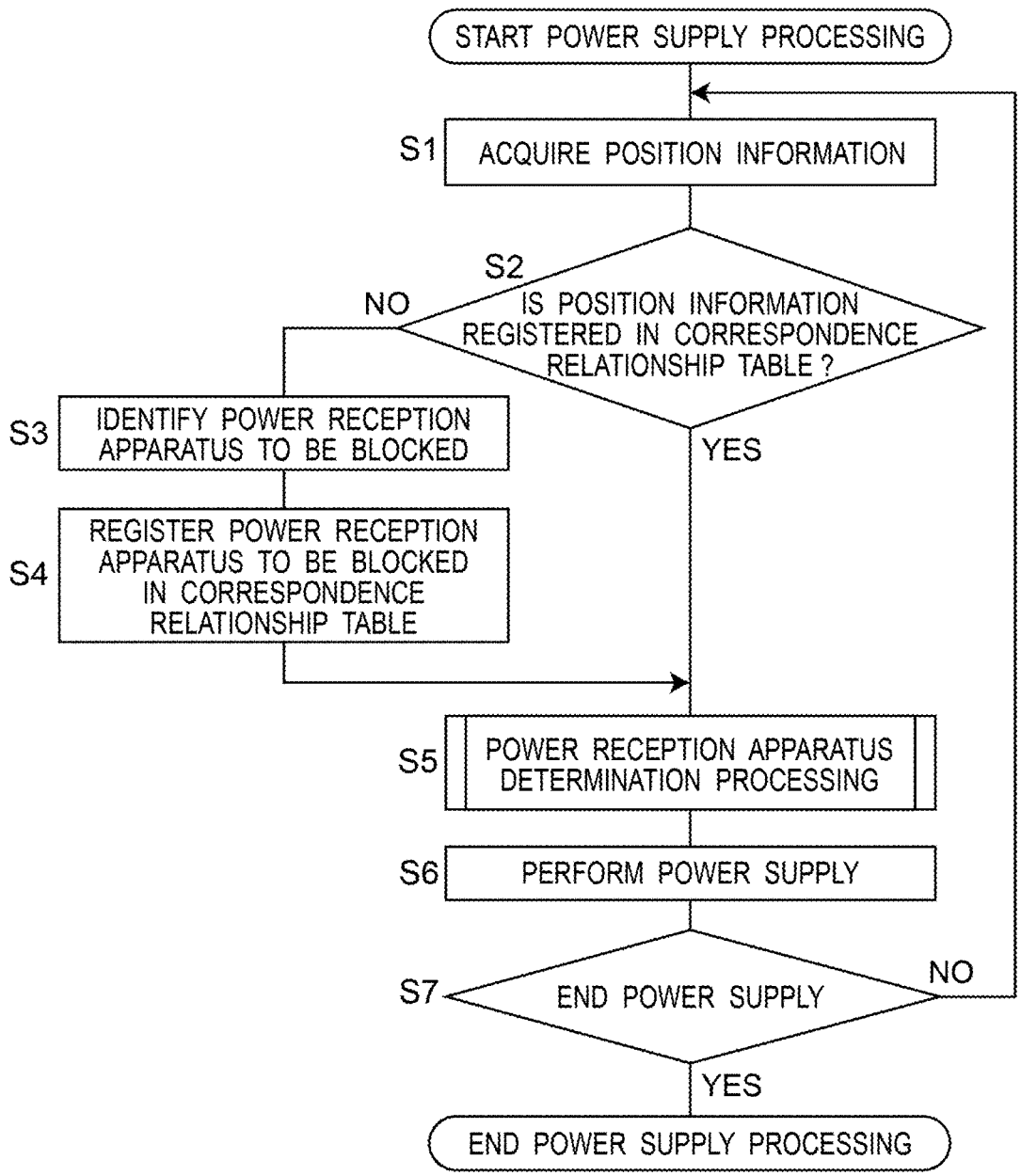
FIG. 3 is a flowchart of a flow of power supply processing performed by the power supply apparatus illustrated in FIG. 1.

Next, operations associated with the power supply processing performed by the power supply apparatus 1 according to the present embodiment will be described with reference to FIG. 3. FIG. 3 is a flowchart of operations associated with the power supply processing.

At step S1 illustrated in FIG. 3, the position information acquisition unit 10b acquires position information (which can be regarded as second position information indicating a second position of the obstruction 2) from the obstruction position detection apparatus 11. In this respect, as described above, the position information indicates the position of the obstruction 2 detected by the obstruction position detection apparatus 11.

Next, at step S2, the processor 10c (for example, the power reception apparatus determination unit 10c4) determines whether the position identified by the position information acquired at step S1 (hereinafter referred to as the position acquired at step S1) is registered in the correspondence relationship table D1, which is stored in the memory 10d.

Figure 4:
FIG. 4 is a diagram illustrating an example correspondence relationship table illustrated in FIG. 2.

FIG. 4 is an illustration of an example of the correspondence relationship table D1, which is stored in the memory 10d. The correspondence relationship table D1 is created in advance by a user before the power supply processing operation is started, for example. In the correspondence relationship table D1, the position of the moving obstruction 2 is correlated to the identifier of the power reception apparatus 1 corresponding to the position. For example, in the correspondence relationship table D1, the position of the obstruction 2 is correlated to the identifier of the power reception apparatus 1 blocked by the obstruction 2 existing at the position.

For example, in the example illustrated in FIG. 4, when the position of the obstruction 2 is a position A, the wireless power supply from the power supply apparatus 10 to the power reception apparatus 1 identified by an identifier ID2 is blocked by the obstruction 2 existing at the position A. Similarly, when the position of the obstruction 2 is a position E, the wireless power supply from the power supply apparatus 10 to the power reception apparatus 1 identified by an identifier ID3 is interrupted by the obstruction 2 existing at the position E.

Referring again to step S2 illustrated in FIG. 3, it is assumed that the processor 10c determines that the position acquired at step S1 is not registered in the correspondence relationship table D1 (NO at step S2). For example, when the position acquired at step S1 is a position K, the position K is not registered in the correspondence relationship table D1 illustrated in FIG. 4. In this case, the power supply apparatus 10 notifies that the position acquired at step S1 is not included in the correspondence relationship table D1.

The user who recognizes the flow of NO (the above-described notification) at step S2 identifies the power reception apparatus 1 that is prevented from receiving power supplied from the power supply apparatus 10 when the obstruction 2 exists at the position acquired at step S1 (step S3). Then, the user registers, in the correspondence relationship table D1, which is stored in the memory 10d, the unregistered position acquired at step S1 and the identifier of the power reception apparatus 1 identified at step S3 and corresponding to the unregistered position (step S4). After step S4, the processor 10c starts the power reception apparatus determination processing at step S5.

As opposed to the above-described case, it is assumed that the processor 10c determines that the position acquired at step S1 is registered in the correspondence relationship table D1 (YES at step S2). For example, when the position acquired at step S1 is a position B, the position B is registered in the correspondence relationship table D1 illustrated in FIG. 4. In this case, the processor 10c starts the power reception apparatus determination processing at step S5.

Figure 5:
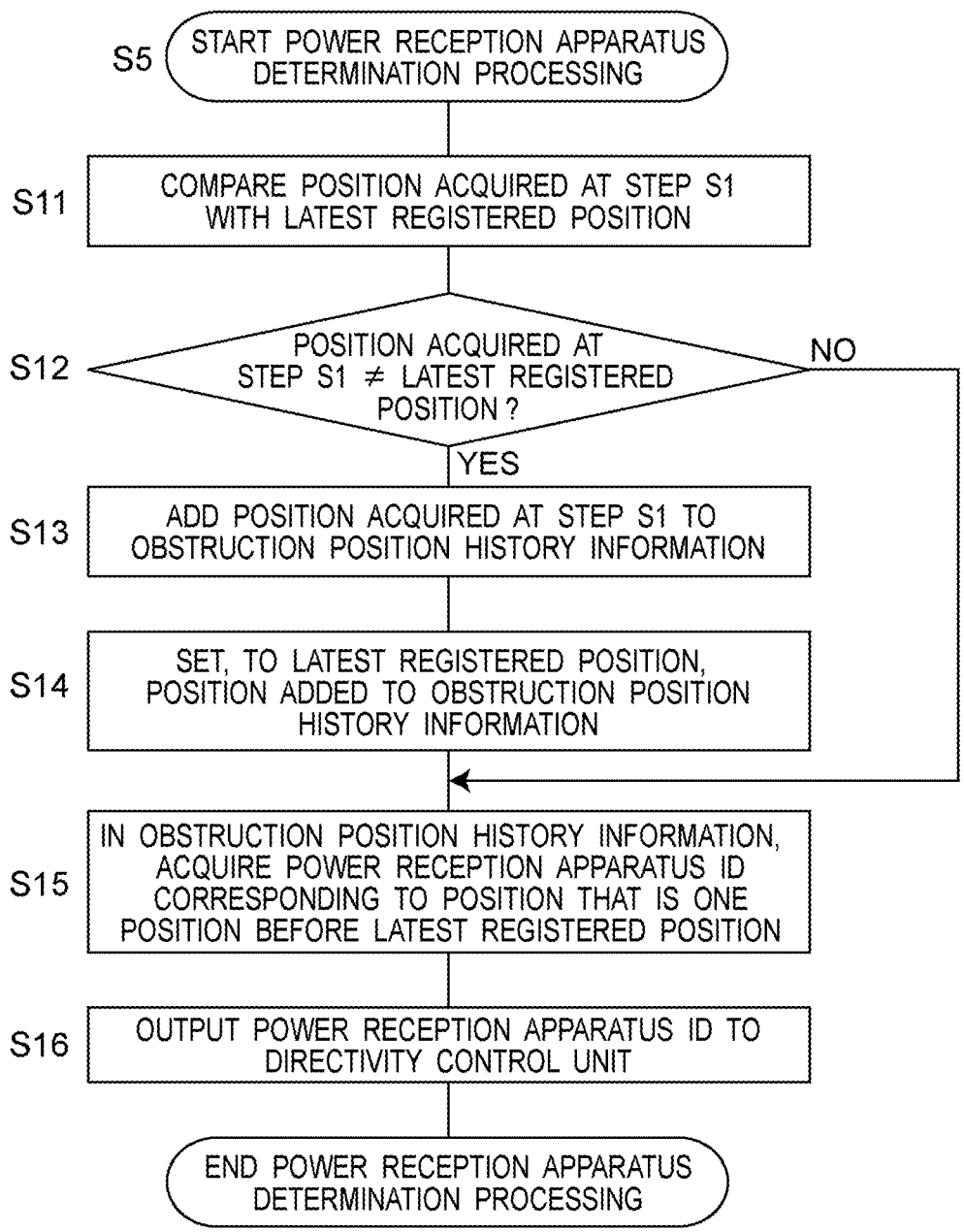
FIG. 5 is a flowchart of a flow of power reception apparatus determination unit processing performed by the power supply apparatus illustrated in FIG. 1.

FIG. 5 is a flowchart of a flow of a specific operations performed by the processor 10c in the power reception apparatus determination processing at step S5. The power reception apparatus determination processing will be described below with reference to FIG. 5.

Figure 6:
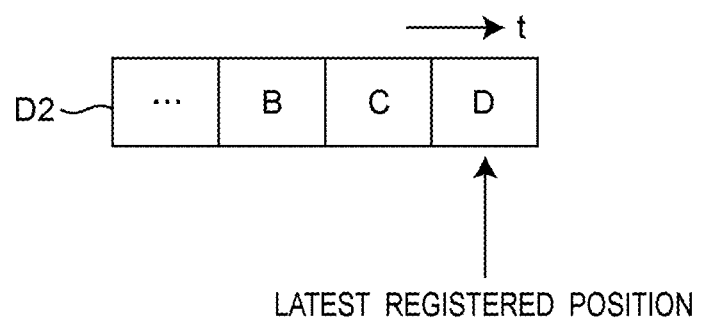
FIG. 6 is a diagram illustrating an example history information table illustrated in FIG. 2.

At step S11 illustrated in FIG. 5, the power reception apparatus determination unit 10c of the processor 10c4 compares the position acquired at step S1 with a "latest registered position", which is included in the obstruction movement history information table (hereinafter simply referred to as history information table) D2. In this respect, the history information table D2 is stored in the memory 10d. FIG. 6 is an illustration of the history information table D2, which is stored in the memory 10d. The history information table D2 is array data in which pieces of the position information acquired by the position information acquisition unit 10b are arranged in time series.

The history information table D2 exemplified in FIG. 6 indicates that the position information acquisition unit 10b has acquired the position information indicating the position B, the position information indicating a position C, and the position information indicating a position D in this order (time series). In a case where the position information acquisition unit 10b continuously receives position information indicating the same position a plurality of times, only the first position information, among the plurality of pieces of continuous information indicating the same position, is registered in the history information table D2. In the history information table D2, the position indicated by the position information registered last in time series is the above-described latest registered position. For example, in the history information table D2 illustrated in FIG. 6, the latest registered position is the position D.

At step S12 illustrated in FIG. 5, as a result of the comparison at step S11, the power reception apparatus determination unit 10c4 determines whether the position acquired at step S1 is different from the latest registered position included in the history information table D2.

At step S12, it is assumed that the power reception apparatus determination unit 10c4 determines that the position acquired at step S1 is different from the latest registered position included in the history information table D2 (YES at step S12). For example, it is assumed that the position acquired at step S1 is the position E, and that the latest registered position included in the history information table D2 is the position D, as illustrated in FIG. 6.

Figure 7:
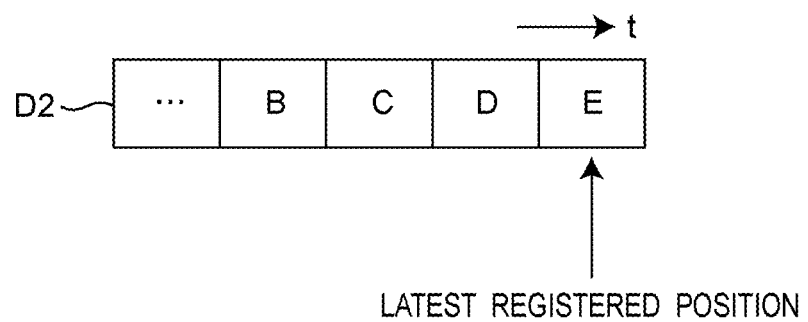
FIG. 7 is a diagram illustrating an example updated history information table illustrated in FIG. 2.

In this case, at step S13, the power reception apparatus determination unit 10c4 additionally registers, in accordance with the time-series order, the position information acquired at step S1 in the history information table D2, which is stored in the memory 10d. FIG. 7 illustrates a state in which position information indicating the position E is registered in the history information table D2, which is stored in the memory 10d, in the above-described example.

After step S13, at step S14, the power reception apparatus determination unit 10c4 newly sets the position indicated by the position information added at step S13 as the latest registered position. In the example illustrated in FIG. 7, the latest registered position included in the history information table D2 is the position E.

After the processing at step S14, the power reception apparatus determination unit 10c4 proceeds to the processing at step S15, which will be described later.

As opposed to the above-described case, at step S12, it is assumed that the power reception apparatus determination unit 10c4 determines that the position acquired at step S1 and the latest registered position included in the history information table D2 are the same (NO at step S12). For example, it is assumed that the position acquired at step S1 is the position D and the latest registered position included in the history information table D2 is the position D, as illustrated in FIG. 6. In this case, the power reception apparatus determination unit 10c4 proceeds to the processing at step S15.

As can be seen from above-described steps S12, S13, and S14, the history information table D2 is updated as follows. When the position identified by the position information located at the end of the history information table D2 in time series is different from the position identified by the position information acquired at step S1, the position information acquired at step S1 is added to the end of the history information table D2. In contrast, when the position identified by the position information located at the end of the history information table D2 in time series is the same as the position identified by the position information acquired at step S1, the position information acquired at step S1 is not added to the end of the history information table D2.

Thus, every time the position information acquisition unit 10b acquires position information, the acquired position information is not necessarily added to the end of the history information table D2. When the position information acquisition unit 10b acquires position information different from the position information at the end of the history information table D2, the acquired position information is added to the end of the history information table D2. It is to be noted that the position identified by the position information located at the end of the history information table D2 is the above-described latest registered position.

At step S15, the power reception apparatus determination unit 10c4 refers to the history information table D2, which is stored in the memory 10d. Then, the power reception apparatus determination unit 10c4 acquires position information (referred to as immediately preceding position information) that is one position before (immediately before) the latest registered position in time series in the history information D2.

Here, it can be understood that the immediately preceding position information previously received by the position information acquisition unit 10b is first position information indicating a first position of the obstruction 2. It can also be understood that the position information received by the position information acquisition unit 10b at the present time (above-described step S1 in FIG. 3) is second position information indicating a second position that is after the obstruction 2 has moved from the first position. As can be understood from the above description, the first position is different from the second position.

The power reception apparatus determination unit 10c4 determines a position (the above-described first position) identified by the immediately preceding position information (the above-described first position information). For example, in the example illustrated in FIG. 6, the latest registered position is the position D, and the position identified by the immediately preceding position information is the position C. In the example illustrated in FIG. 7, the latest registered position is the position E, and the position identified by the immediately preceding position information is the position D.

Further at step S15, the power reception apparatus determination unit 10c4 determines the power-supply-target power reception apparatus 1 using the immediately preceding position information and the correspondence relationship table D1, which is stored in the memory 10d. Specifically, the power reception apparatus determination unit 10c4 refers to the correspondence relationship table D1. Then, by this reference, the power reception apparatus determination unit 10c4 determines the identifier of the power reception apparatus 1 corresponding to the position identified by the immediately preceding position information. Then, the power reception apparatus determination unit 10c4 determines, as the power-supply-target power reception apparatus 1, the power reception apparatus 1 identified by the acquired identifier.

For example, when the position identified by the immediately preceding position information is the position C in the history information table D2 illustrated in FIG. 6, the power reception apparatus determination unit 10c4 acquires an identifier ID4 of the power reception apparatus 1 corresponding to the position C in the correspondence relationship table D1 illustrated in FIG. 4. Then, the power reception apparatus determination unit 10c4 determines, as the power-supply-target power reception apparatus 1, the power reception apparatus 1 identified by the identifier ID4.

When, for example, the position identified by the immediately preceding position information is the position D in the history information table D2 illustrated in FIG. 7, the power reception apparatus determination unit 10c4 acquires an identifier ID1 of the power reception apparatus 1 corresponding to the position D in the correspondence relationship table D1 exemplified in FIG. 4. Then, the power reception apparatus determination unit 10c4 determines, as the power-supply-target power reception apparatus 1, the power reception apparatus 1 identified by the identifier ID1.

Next, at step S16 illustrated in FIG. 5, the power reception apparatus determination unit 10c4 outputs, to the directivity control unit 10f, information including the identifier of the power-supply-target power reception apparatus 1 determined at step S15. In other words, the power reception apparatus determination unit 10c4 controls the directivity control unit 10f to steer a radio wave to the power-supply-target power reception apparatus 1 determined in step S15.

Thus, the power reception apparatus determination processing at step S5 illustrated in FIG. 3 (illustrated in FIG. 5) ends, and then the processing at step S6 illustrated in FIG. 3 is performed. Specifically, at step S6, the directivity control unit 10f controls the directivity of the power supply antenna 10c4 based on the control from the power reception apparatus determination unit 10a.

By controlling the directivity, the main beam of the radio wave output from the power supply antenna 10a is directed to the power-supply-target power reception apparatus 1 determined by the power reception apparatus determination unit 10c4. Then, the directivity control unit 10f supplies the radio wave generated by the power supply signal generation unit 10e to the power supply antenna 10a. Thus, the power supply antenna 10a is able to emit power toward the power-supply-target power reception apparatus 1 determined at step S15 illustrated in FIG. 5. The power emitted to the power-supply-target power reception apparatus 1 is not blocked by the obstruction 2.

Next, at step S7, the overall control unit 10c1 determines whether a scheduled series of power supply processings has ended. When the overall control unit 10c1 determines that the scheduled series of power supply processings has not ended (NO at step S7), the procedure returns to the processing at step 1. In contrast, when the overall control unit 10c1 determines that the scheduled series of power supply processings has ended (YES at step S7), the power supply apparatus 10 ends the power supply processing illustrated in FIG. 3.

As described above, the power supply apparatus 10 according to the present embodiment included in the power supply system 100 illustrated in FIG. 1 includes the power supply antenna 10a, the directivity control unit 10f, the position information acquisition unit 10b, and the processor 10c. The power supply antenna 10a emits, to each of the plurality of power reception apparatuses 1, a radio wave that is based on a power supply signal. The directivity control unit controls the directivity of the power supply antenna 10a. The position information acquisition unit 10b acquires position information indicating the position of the obstruction 2 moving between the power supply antenna 10a and the power reception apparatus 1. Based on the position information, the processor 10c (power reception apparatus determination unit 10c4), which serves as a control unit, determines a power-supply-target power reception apparatus 1, among the plurality of power reception apparatuses 1, to which power is to be supplied while avoiding the obstruction 2. Further, the processor 10c (power reception apparatus determination unit 10c4) controls the directivity control unit 10f to steer a radio wave to this power-supply-target power reception apparatus 1.

With this configuration, the power supply apparatus 10 according to the present embodiment acquires position information indicating the position of the obstruction 2 at each power supply timing, thereby determining a power-supply-target power reception apparatus 1, among the plurality of power reception apparatuses 1, that is capable of receiving a radio wave without blockage by the obstruction 2.

Further, the power supply apparatus 10 is capable of dynamically controlling the directivity of the power supply antenna 10a by continuously acquiring position information indicating the position of the moving obstruction 2. This prevents interruption of the wireless power supply processing performed between the power supply apparatus 10 and the plurality of power reception apparatuses 1, regardless of the presence of the moving obstruction 2. In other words, even if there is a moving obstruction 2 that may interfere with power supply, efficient power supply processing is performed between the power supply apparatus 10 and the plurality of power reception apparatuses 1 without wireless power supply being interrupted by the obstruction 2.

Figure 8:
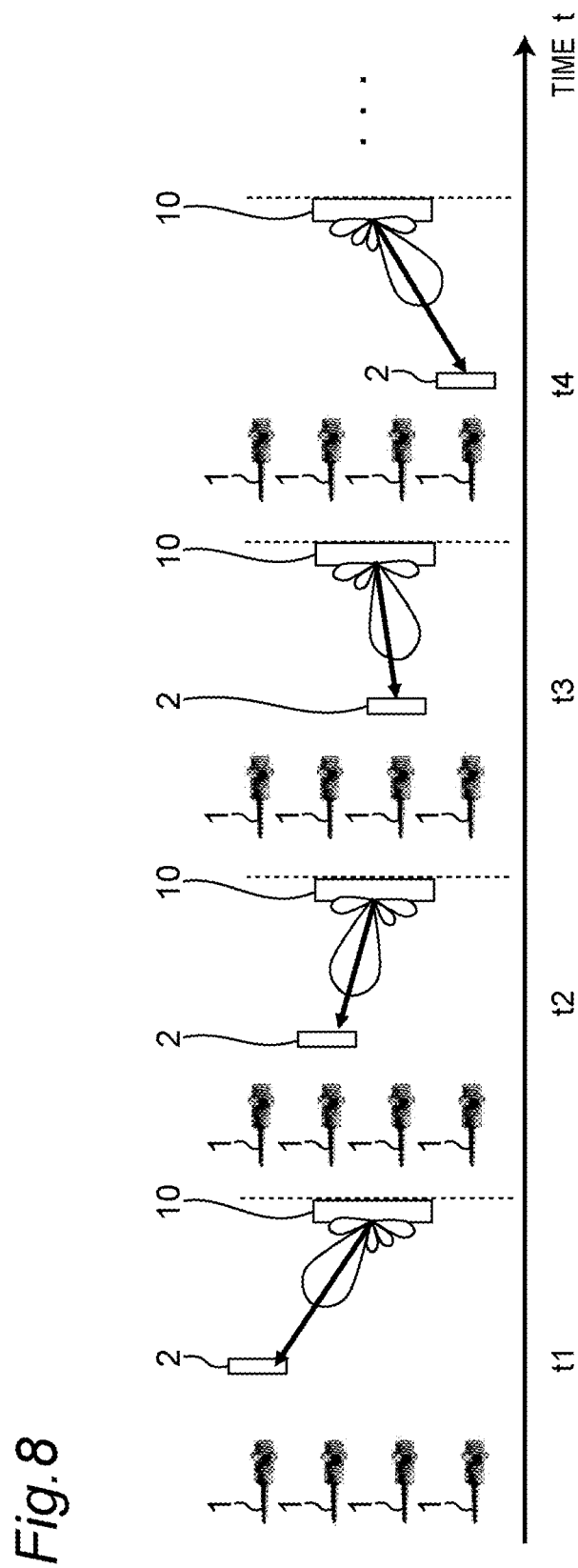
FIG. 8 is an illustration of a state in which a radio wave output from the power supply apparatus is blocked by an obstruction.

For example, assume a case where the power supply apparatus 10 emits a radio wave to each power reception apparatus 1 without the position of the moving obstruction 2 taken into consideration. In this case, a problem as illustrated in FIG. 8 may occur. Specifically, as illustrated in FIG. 8, there may be a problem in that radio waves emitted from the power supply apparatus 10 to the power reception apparatuses 1 are continuously blocked by the moving obstruction 2. The example illustrated in FIG. 8 can be understood as a least efficient example in terms of power supply.

Figure 9:
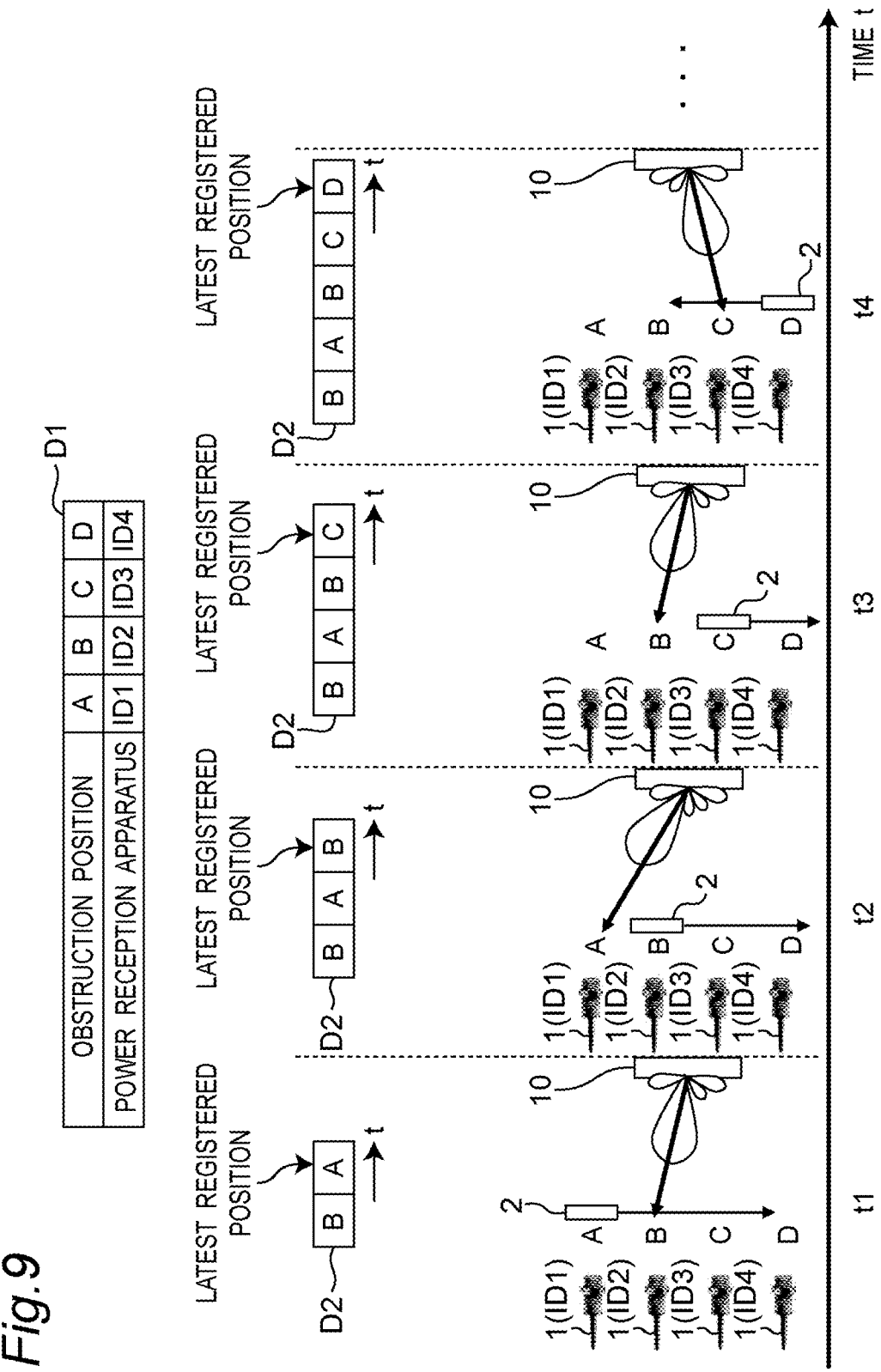
FIG. 9 is an illustration of a state in which a radio wave output from the power supply apparatus illustrated in FIG. 1 is transmitted to the power reception apparatus without being blocked by an obstruction.

In contrast, in the power supply apparatus 10 according to the present embodiment, the power supply apparatus 10 is capable of, based on position information indicating the position of the moving obstruction 2, continuously changing the directivity of a radio wave emitted from the power supply apparatus 10, as described above. FIG. 9 exemplifies a state in which using position information indicating the position of the moving obstruction 2, the power supply apparatus 10 dynamically controls the directivity of radio waves emitted from the power supply antenna 10a while avoiding the obstruction 2.

As illustrated in FIG. 9, when the power supply apparatus 10 according to the present embodiment emits a radio wave to each power reception apparatus 1, the radio wave is not blocked by the moving obstruction 2. FIG. 9 also illustrates an example of the correspondence relationship table D1, which is stored in the memory 10d, and examples of the history information table D2 stored in the memory 10d at the end of step S5 in FIG. 3 and corresponding to time t1 to t4.

It is to be noted that when the power supply apparatus 10 according to the present embodiment is not employed, it is necessary to, for example, determine and/or change the installation locations of the power reception apparatuses 1 and the power supply apparatus 10 in consideration of movement or the like of the obstruction 2, which is an obstruction element for radio waves. When the number of power reception apparatuses 1 increases, the degree of freedom of their installation locations is limited, and it may be difficult to find appropriate installation locations. In light of this situation, in the power supply apparatus 10 according to the present embodiment, the directivity of the power supply antenna 10a is dynamically controlled based on position information indicating the position of the moving obstruction 2, as described above. This ensures that the installation of, for example, the power reception apparatuses 1 is easily determined.

The power supply apparatus 10 according to the present embodiment further includes the memory 10d, which stores the correspondence relationship table D1. After acquiring position information indicating the past position of the obstruction 2, the position information acquisition unit 10b acquires position information indicating the current position of the obstruction 2 after movement. Further, at step S1 illustrated in FIG. 3, when the position information acquisition unit 10b acquires the position information indicating the current position of the obstruction 2, the processor 10c (power reception apparatus determination unit 10c4) refers to the correspondence relationship table D1 and determines the identifier of the power-supply-target power reception apparatus 1 corresponding to the position identified by the immediately preceding position information (step S15 illustrated in FIG. 5). Then, the processor 10c (power reception apparatus determination unit 10c4) controls the directivity control unit 10f to steer a radio wave to this power suppliable power reception apparatus 1 (step S16 in FIG. 5).

With this configuration, the power supply apparatus 10 according to the present embodiment is capable of automatically determining the power-supply-target power reception apparatus 1 based on the current position information, acquisition history of the past position information (history information table D2), and the correspondence relationship table D1. Accordingly, even if there is a change in the movement pattern of the obstruction 2, the power-supply-target power reception apparatus 1 is automatically determined without blockage by the obstruction 2.

In the power supply apparatus 10 according to the present embodiment, the position information acquisition unit 10b acquires position information transmitted from the obstruction position detection apparatus 11, which detects the position of the obstruction 2.

With this configuration, the power supply apparatus 10 according to the present embodiment is capable of controlling the directivity of the power supply antenna 10a in consideration of the actual position of the moving obstruction 2.

Figure 10:
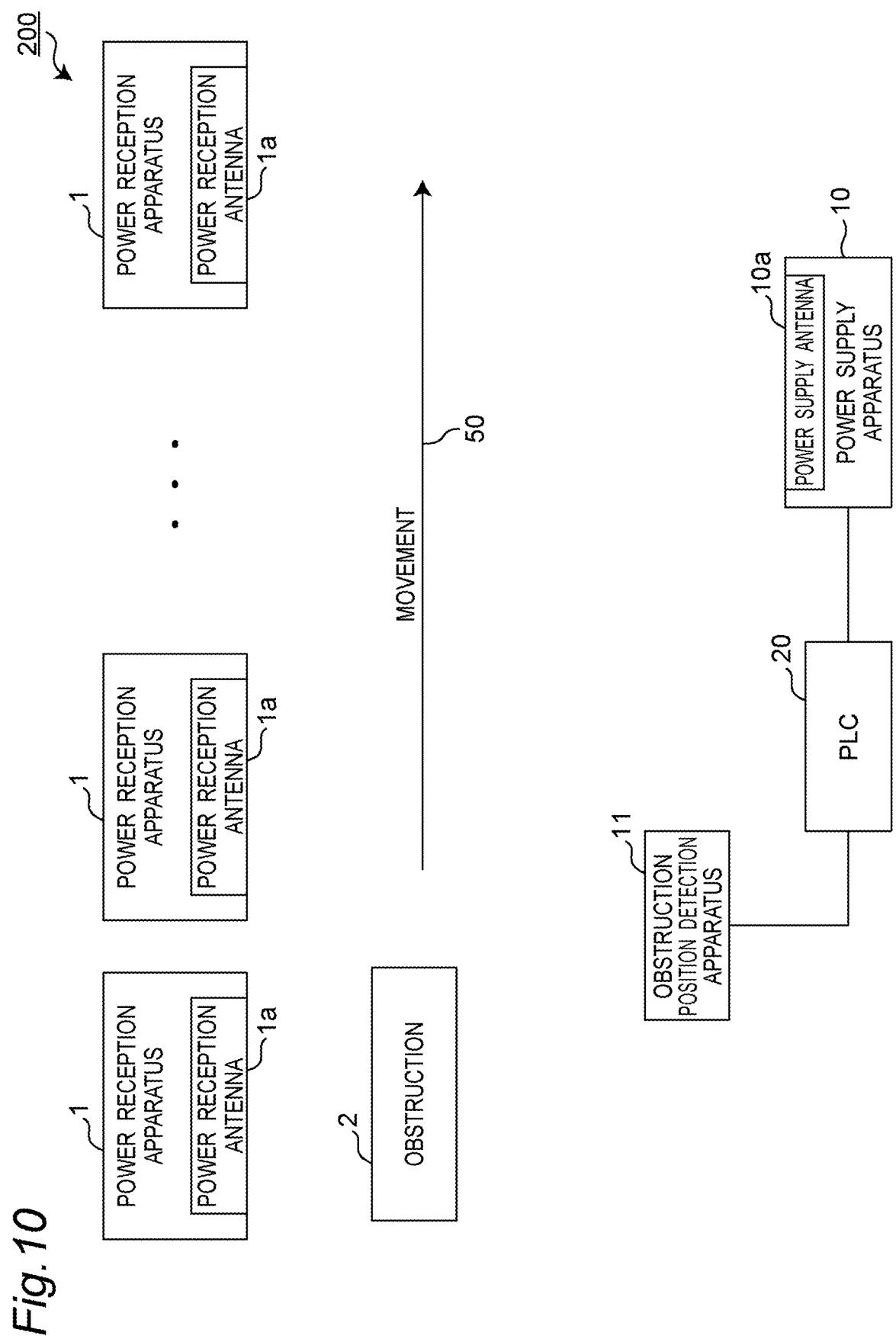
FIG. 10 is a diagram illustrating a schematic configuration of a power supply system according to another embodiment.

In the above-described embodiment, the position information acquisition unit 10b acquires the position information transmitted from the obstruction position detection apparatus 11. However, the position information acquisition unit 10b may acquire position information indicating the position of the obstruction 2 by any other method. FIG. 10 illustrates an example of a configuration of a power supply system 200 according to another embodiment.

As illustrated in FIG. 10, in the power supply system 200, a programmable logic control unit (PLC) 20 is connected to the power supply apparatus 10. More specifically, in the configuration example illustrated in FIG. 10, the PLC 20 is connected to and between the obstruction position detection apparatus 11 and the power supply apparatus 10. It is to be noted that the connection between the PLC 20 and the power supply apparatus 10 may be a wireless communication connection or a wired communication connection.

The PLC 20 is an obstruction control apparatus that controls the movement of the obstruction 2 in accordance with a control flow set in the PLC 20. In the control flow, control information indicating how to move the obstruction 2 in terms of time is defined. With this configuration, by referring to the control information of the control flow, the position of the obstruction 2 at a certain point of time can be identified.

In the configuration example illustrated in FIG. 10, during the supply of power, the PLC 20 refers to the control information of the control flow (based on the control of the obstruction 2 by the PLC 20), and identifies the position of the obstruction 2 at a certain point of time. Then, the PLC 20 identifies the position as time passes, and continuously transmits position information indicating the identified position to the position information acquisition unit 10b. Thus, in the example illustrated in FIG. 10, the power supply apparatus 10 (position information acquisition unit 10b) acquires the position information transmitted from the PLC 20, which controls the movement of the obstruction 2. It is to be noted that although the transmission source of the position information is different between the power supply system 100 and the power supply system 200, the other configurations and the operations described with reference to FIG. 3 and FIG. 5 are the same between the power supply system 100 and the power supply system 200.

Thus, the power supply apparatus 10 illustrated in FIG. 10 is capable of, without detecting the actual position of the obstruction 2, dynamically controlling the directivity of the power supply antenna 10a using the position information of the obstruction 2 included in the control flow of the PLC 20.

In the example illustrated in FIG. 10, the position information acquisition unit 10b is capable of acquiring position information not only from the PLC 20 but also from the obstruction position detection apparatus 11 (for example, via the PLC 20 or not via the PLC 20). However, for example, in the power supply system 200 illustrated in FIG. 10, the obstruction position detection apparatus 11 may be omitted.

Incidentally, while power is being supplied wirelessly, a moving object (a moving obstruction) may intervene between the power supply apparatus and the power reception apparatus. When an obstruction exists between the power supply apparatus and the power reception apparatus, the radio wave output from the power supply apparatus toward the power reception apparatus is blocked. That is, power supply processing is interrupted.

In light of the circumstances described above, the present embodiment provides a power supply apparatus capable of, regardless of the presence of a moving obstruction, preventing interruption of wireless power supply processing performed between the power supply apparatus and at least two or more power reception apparatuses. The present embodiment also provides a power supply system that includes the power supply apparatus.

In order to solve the above-described problem, a power supply apparatus according to a first aspect of the present disclosure includes a power supply antenna, a directivity control unit, a position information acquisition unit, and a control unit. The power supply antenna is configured to emit, to a plurality of power reception apparatuses, a radio wave that is based on a power supply signal. The directivity control unit is configured to control directivity of the power supply antenna. The position information acquisition unit is configured to acquire position information indicating a position of an obstruction moving between the power supply antenna and at least one power reception apparatus of the plurality of power reception apparatuses. Based on the position information, the control unit is configured to determine a power reception apparatus, among the plurality of power reception apparatuses, to which power is to be supplied while avoiding the obstruction. The control unit is also configured to control the directivity control unit to steer the radio wave toward the determined power reception apparatus.

With this configuration, the power supply apparatus is capable of preventing, regardless of the presence of a moving obstruction, interruption of wireless power supply processing performed between the power supply apparatus and the plurality of power reception apparatuses.

A power supply system according to a second aspect of the present disclosure includes a plurality of power reception apparatuses, a power supply apparatus, and an obstruction position detection apparatus. The power supply apparatus is configured to supply power wirelessly to the plurality of power reception apparatuses. The obstruction position detection apparatus is configured to make a detection of a position of an obstruction moving between the power supply apparatus and at least one power reception apparatus of the plurality of power reception apparatuses. The obstruction position detection apparatus is configured to transmit a result of the detection to the power supply apparatus as position information. The power supply apparatus includes a power supply antenna, a directivity control unit, a position information acquisition unit, and a control unit. The power supply antenna is configured to emit, to a plurality of power reception apparatuses, a radio wave that is based on a power supply signal. The directivity control unit is configured to control directivity of the power supply antenna. The position information acquisition unit is configured to acquire position information from the obstruction position detection apparatus. Based on the position information, the control unit is configured to determine a power reception apparatus, among the plurality of power reception apparatuses, to which power is to be supplied while avoiding the obstruction. The control unit is configured to control the directivity control unit to steer the radio wave toward the determined power reception apparatus.

With this configuration, the power supply system is capable of preventing, regardless of the presence of a moving obstruction, interruption of wireless power supply processing performed between the power supply apparatus and the plurality of power reception apparatuses. The power supply system is also capable of controlling the directivity of the power supply antenna in consideration of the actual position of the moving obstruction.

A power supply system according to a third aspect of the present disclosure includes a plurality of power reception apparatuses, a power supply apparatus, and an obstruction control apparatus. The power supply apparatus is configured to supply power wirelessly to the plurality of power reception apparatuses. The obstruction control apparatus is configured to perform control of movement of an obstruction moving between the power supply apparatus and at least one power reception apparatus of the plurality of power reception apparatuses The obstruction control apparatus is configured to transmit, to the power supply apparatus, position information indicating a position of the obstruction identified based on the control. The power supply apparatus includes a power supply antenna, a directivity control unit, a position information acquisition unit, and a control unit. The power supply antenna is configured to emit, to a plurality of power reception apparatuses, a radio wave that is based on a power supply signal. The directivity control unit is configured to control directivity of the power supply antenna. The position information acquisition unit is configured to acquire position information from the obstruction control apparatus. Based on the position information, the control unit is configured to determine a power reception apparatus, among the plurality of power reception apparatuses, to which power is to be supplied while avoiding the obstruction. The control unit is configured to control the directivity control unit to steer the radio wave toward the determined power reception apparatus.

With this configuration, the power supply system is capable of preventing, regardless of the presence of a moving obstruction, interruption of wireless power supply processing performed between the power supply apparatus and the plurality of power reception apparatuses. The power supply system is also capable of dynamically controlling the directivity of the power supply antenna by, instead of detecting the actual position of the obstruction, using the position of the obstruction identified based on the control of the movement of the obstruction by the obstruction control apparatus.

A power supply apparatus according to the present disclosure is capable of preventing, regardless of the presence of a moving obstruction, interruption of wireless power supply processing performed between the power supply apparatus and at least two or more power reception apparatuses.

Although the plurality of embodiments described above can be implemented independently, it is also possible to combine the embodiments with each other. Also, although the various features in the different embodiments can be implemented independently, it is possible to combine the features in the different embodiments with each other.

DESCRIPTION OF REFERENCE

1 Power reception apparatus
2 Obstruction
10 Power supply apparatus
10a Power supply antenna
10b Power reception apparatus determination unit
10c Processor
10c3 Directivity control unit
10c4 Power reception apparatus determination unit
10d Memory
11 Obstruction position detection apparatus
100, 200 Power supply system
D1 Correspondence relationship table
D2 Obstruction movement history information table (history information table)

The invention claimed is:

1. A power supply apparatus comprising:
a power supply antenna configured to emit, to one or more of a plurality of power reception apparatuses, a radio wave that is based on a power supply signal;
a directivity control unit configured to control directivity of the power supply antenna;
a position information acquisition unit configured to dynamically acquire position information indicating a position of an obstruction moving between the power supply antenna and the plurality of power reception apparatuses; and
a control unit configured to:
based on the position information, determine a power reception apparatus, among the plurality of power reception apparatuses, to which power is to be supplied based on the position the obstruction; and
control the directivity control unit to steer the radio wave toward the determined power reception apparatus; and
dynamically change the determined power reception apparatus as a result of detection of movement of the obstruction between the power supply antenna and the plurality of power reception apparatuses.

2. The power supply apparatus according to claim 1, further comprising a memory storing a correspondence relationship table showing a relationship between the position of the obstruction and an identifier of a power reception apparatus, among the plurality of power reception apparatuses, that corresponds to the position,
wherein after the position information acquisition unit has acquired first position information indicating a first position of the obstruction, the position information acquisition unit is configured to acquire second information indicating a second position of the obstruction that has moved, and
wherein upon the position information acquisition unit acquiring the second position information, the control unit is configured to:
with reference to the correspondence relationship table, determine an identifier of a power reception apparatus, among the plurality of power reception apparatuses, that corresponds to the first position identified by the first position information; and
control the directivity control unit to steer the radio wave toward the power reception apparatus having the determined identifier.

3. The power supply apparatus according to claim 1, wherein the position information acquisition unit is configured to acquire the position information such that the position information is transmitted from an obstruction position detection apparatus configured to detect the position of the obstruction.

4. The power supply apparatus according to claim 1, wherein the position information acquisition unit is configured to acquire the position information such that the position information is transmitted from an obstruction detection apparatus configured to detect movement of the obstruction.

5. A power supply system comprising:
a plurality of power reception apparatuses;
a power supply apparatus configured to supply power wirelessly to the plurality of power reception apparatuses; and
an obstruction position detection apparatus configured to:
make a detection of a position of an obstruction moving between the power supply apparatus and at least one power reception apparatus of the plurality of power reception apparatuses; and transmit a result of the detection to the power supply apparatus as position information, wherein the power supply apparatus comprises a power supply antenna configured to emit, to the plurality of power reception apparatuses, a radio wave that is based on a power supply signal, a directivity control unit configured to control directivity of the power supply antenna, a position information acquisition unit configured to acquire the position information from the obstruction position detection apparatus, and a control unit configured to:
based on the position information, determine a power reception apparatus, among the plurality of power reception apparatuses, to which power is to be supplied while avoiding the obstruction; and control the directivity control unit to steer the radio wave toward the determined power reception apparatus; and dynamically change the determined power reception apparatus as a result of detection of movement of the obstruction between the power supply antenna and the plurality of power reception apparatuses.

6. A power supply system comprising:
a plurality of power reception apparatuses;
a power supply apparatus configured to supply power wirelessly to the plurality of power reception apparatuses; and an obstruction detection apparatus configured to:
detect movement of an obstruction moving between the power supply apparatus and at least one power reception apparatus of the plurality of power reception apparatuses; and transmit, to the power supply apparatus, position information indicating a position of the obstruction identified based on the control, wherein the power supply apparatus comprises a power supply antenna configured to emit, to the plurality of power reception apparatuses, a radio wave that is based on a power supply signal, a directivity control unit configured to control directivity of the power supply antenna, a position information acquisition unit configured to acquire the position information from the obstruction control apparatus, and a control unit configured to:
based on the position information, determine a power reception apparatus, among the plurality of power reception apparatuses, to which power is to be supplied while avoiding the obstruction; and control the directivity control unit to steer the radio wave toward the determined power reception apparatus; and dynamically change the determined power reception apparatus as a result of detection of movement of the obstruction between the power supply antenna and the plurality of power reception apparatuses.

\* \* \* \* \*